United States Patent Office

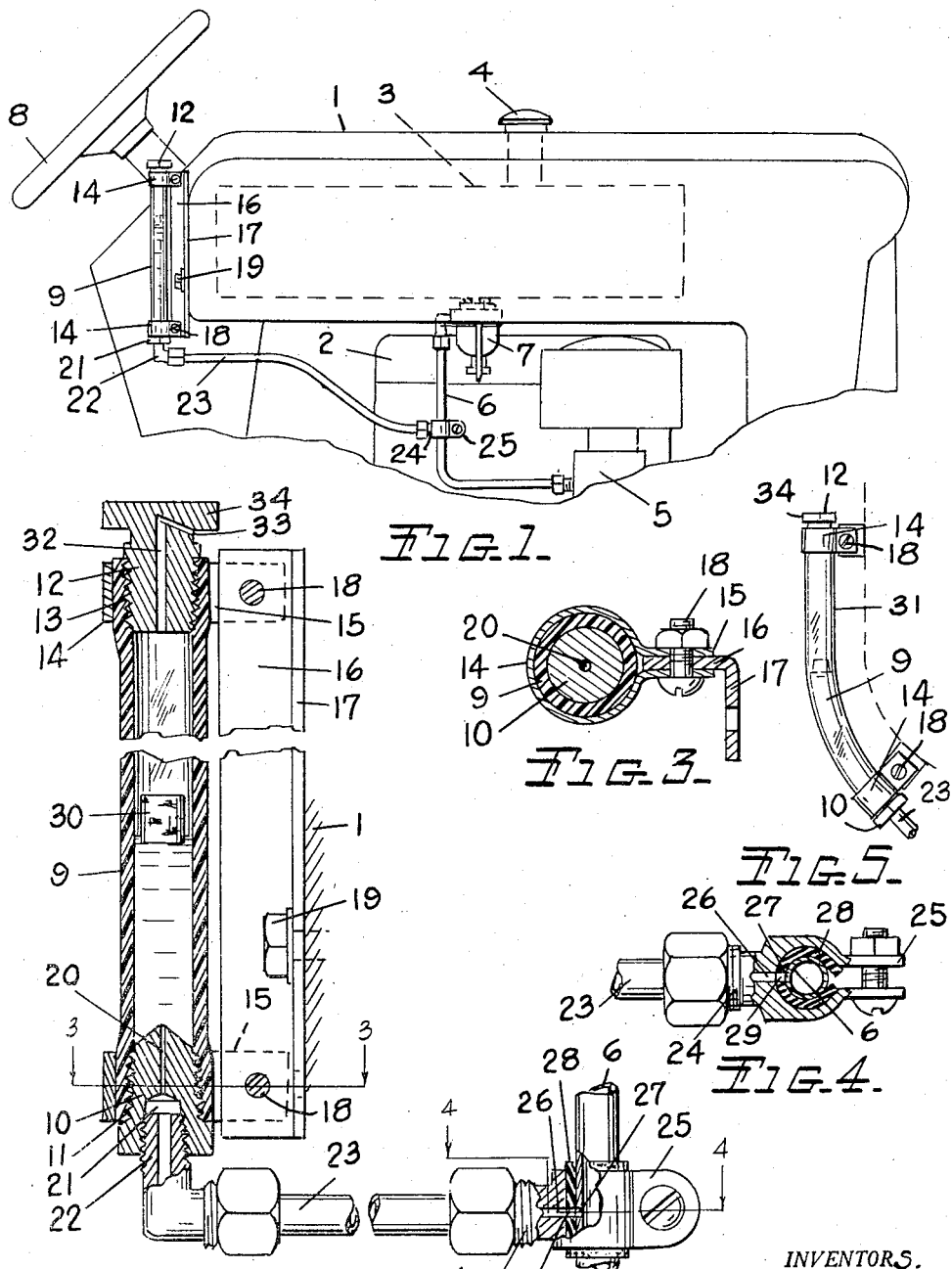

2,833,148
Patented May 6, 1958

2,833,148

SIGHT TANK GAUGE

Leo E. Hoyt, Climax, and Paul D. Blanchard, Battle Creek, Mich.

Application October 25, 1954, Serial No. 464,347

4 Claims. (Cl. 73—323)

This invention relates to a sight tank gauge which may be readily applied to the fuel tank of a tractor, or the like, and the gauge positioned conveniently for observation and one which is well adapted to withstand the shocks and jars and rough usage incident to tractors.

The main objects of this invention are

First, to provide a sight tank gauge for the fuel tanks of tractors and the like, which may be easily and quickly mounted thereon and positioned for convenient observation by the operator of the tractor.

Second, to provide a gauge having these advantages which is capable of withstanding shocks and jars and blows to which an exposed gauge is likely to be subjected when mounted on a machine such as a tractor.

Third, to provide a gauge which may be quickly and easily applied as an attachment, as distinguished from being built into a tank structure, or requiring that the tank structure be especially adapted to receive the same.

Fourth, to provide a gauge having these advantages which is quite simple and economical in its parts and assembly thereof.

Further objects relating to details and economies of the invention will appear from the description to follow. The invention is defined and pointed out in the claims.

A preferred embodiment of the invention is illustrated in the accompanying drawing, in which Fig. 1 is a side elevational view of portions of a tractor, shown conventionally, with the gauge of our invention mounted thereon.

Fig. 2 is an enlarged fragmentary view partially in vertical section showing structural details of our gauge and of the connections therefor to a tank.

Fig. 3 is a horizontal section mainly in section line 3—3 of Fig. 2.

Fig. 4 is a fragmentary view, partially in section, on a line corresponding to line 4—4 of Fig. 2.

Fig. 5 is a fragmentary side elevational view illustrating an adaptation of our gauge requiring the coupling or bending of the sight tube thereof.

In the accompanying drawing 1 represents the body of a tractor. 2 the engine thereof. 3 represents the tank provided with a filling opening 4. The engine carburetor conventionally shown at 5 is connected to the tank through the feed pipe 6. 7 represents a filtering and settling device. These parts are shown conventionally as they form no part of our invention. The seat of the tractor is not illustrated, but it is understood that it is conventionally associated with the steering wheel 8.

The gauge of our invention comprises a sight tube 9 formed of transparent flexible bendable plastic material, such for example as nylon tubing. The bottom closure 10 is threaded or ribbed, as indicated at 11, and is expandably inserted in the lower end of the tube 9. The top closure 12 is similarly tapered and ribbed, as indicated at 13, and is expandably inserted in the upper end of the tube.

Portions of the tube surrounding the top and bottom members are clamped thereon by the U shaped clamps 14, the arms 15, which in the embodiment illustrated, are designed as support members. The arms of the clamps are arranged on opposite sides of the outwardly projecting arm 16 of the bracket 17 of angular section and secured thereto and clamped upon the tube by means of bolts 18. The bracket is adapted to be mounted on a suitable supporting part of the tractor by means of bolts or screws 19, desirably as is illustrated in the drawing, in position to be conveniently observed by the driver of the vehicle.

The bottom closure 10 is provided with restricted flow passage 20 having an internally threaded enlargement 21 at its lower end into which the coupling member 22 of the flow or connecting conduit 23 is threaded. The conduit 23 is preferably a section of flexible tubing and is provided with a coupling fixture 24 at its inner end, the fixture being provided with supply pipe clamping arms 25 adapted to embrace the feed supply pipe 6, as is shown in Figs. 4 and 5. The fixture 24 is provided with a passage 26 adapted to register with a hole 27 formed in the pipe 6. The coupling fixture clamp is provided with packing 28 having a hole 29 registering with the hole 27 in the pipe.

A practical way to form this connection is to clamp the fixture 24 upon the pipe in the desired position and form the holes 27 and 29 with a prick punch, or the like, inserted through the passage 26 in the fixture 24. This arrangement of parts provides a very effective and convenient means for connecting the gauge to the tank. A freely movable float 30 is desirably provided, although the height of the liquid may be observed without the float. This, however, requires more care and closer scrutiny than where the float is present but it will be appreciated that many gasoline products are now colored and diesel fuel is normally colored.

In some installations it is desirable to bend the sight tube, as shown at 31 in Fig. 5. The tube which is formed of flexible material allows it to be bent and mounted as desired without injury.

The tube closure member 12 is provided with a vent 32. The vent opening 33 is below the flange 34 which constitutes a guard and shield for the opening 33, that is it prevents its becoming clogged with dirt or the like.

The flow passage 20 is restricted so that the liquid in the gauge does not reflect the surging of the liquid in the tank, which is incident to the use of tractors. The restricted flow passage 20 permits a sufficient flow to properly gauge the tank both when the tractor or other machine is in use and in the filling of the tank. While the size of the flow passage or the degree of restriction thereof is variable within a rather wide range, it should, as illustrated, be less than one fifth the inside diameter of the sight tube and approach capillary size.

We have illustrated and described our invention in a highly practical embodiment thereof. We have not attempted to illustrate or describe the various adaptations in the mounting of the gauge and in the connection to the tank which may be desirable for particular conditions, as it is believed that this disclosure would enable those skilled in the art to adapt our invention as may be desired.

Having thus described the invention, what is claimed to be new and is desired to be secured by Letters Patent is:

1. A tank gauge of the class described comprising a sight tube of transparent flexible plastic material, top and bottom closure members having ribbed portions with the ribs extending annularly around said members and disposed within and expanding the ends of the tube, the top closure member having a vent opening therein in an inverted U-shaped position to open downwardly both inside and outside of said tube, a laterally projecting portion on said top closure member overhanging the outer end of said vent opening, the bottom closure member having a restricted flow passage therein with an internally threaded enlarged portion at its outer end, the diameter of said restricted portion of said flow passage being small enough to throttle and substantially eliminate pressure and level changes incident to surging of liquid in the tank to which said gauge is connected, U-clamps embracing and clamped upon end portions of the tube embracing said top and bottom closures and deforming the walls of the tube into sealing relation around the ribs on said closure members, said clamps having arms at each end for clamping said clamps to said tube, a mounting bracket disposed between the arms of the clamps and to which they are secured, and a flexible flow tube provided with a coupling at its outer end threaded into said bottom closure member.

2. A tank gauge of the class described comprising a sight tube of transparent flexible plastic material, top and bottom closure members having portions disposed within and expanding the ends of the tube, the top closure member having a vent opening therein in an inverted U-shaped position to open downwardly both inside and outside of said tube, a laterally projecting portion on said top closure member overchanging the outer end of said vent opening, the bottom closure member having a restricted flow passage therein, the diameter of said restricted portion of said flow passage being small enough to throttle and substantially eliminate pressure and level changes incident to surging of liquid in the tank to which said gauge is connected, clamps embracing and clamped upon the end portions of the tube embracing said top and bottom closures, said clamps constituting support attaching members, and a flexible flow tube connected to said bottom closure member and communicating with the flow passage therein.

3. A tank gauge for tractors and the like comprising a sight tube of transparent flexible plastic material, top and bottom closure members having ribbed portions with the ribs extending annularly around said members and disposed in the ends of the tube, the top closure member having a vent opening, and the bottom closure member having a restricted flow passage therein in an inverted U-shaped position to open downwardly both inside and outside of said tube, the diameter of said restricted portion of said flow passage being small enough to throttle and substantially eliminate pressure and level changes incident to surging of liquid in the tank to which said gauge is connected, a float freely movable in said tube, clamps embracing and clamped upon portions of the tube around said top and bottom members and deforming the walls of the tube into sealing relation around the ribs in said closure members, said clamps constituting mounting elements, a flexible flow tube provided wtih a coupling at its outer end detachably connected to said bottom closure member and communicating with the flow passage therein, and a coupling fixture at the inner end of said flow tube.

4. A tank gauge of the class described comprising a sight tube of transparent flexible plastic material, top and bottom closure members having portions disposed within the ends of the tube, the top closure member having a vent opening therein in an inverted U-shaped position to open downwardly both inside and outside of said tube, the bottom closure member having a restricted flow passage therein, U clamps embracing and clamped upon end portions of the tube embracing said top and bottom closure, the arms of the clamps constituting mounting means for said tube, and a flexible flow tube connected to said bottom closure member and communicating with said flow passage.

References Cited in the file of this patent

UNITED STATES PATENTS

| | | |
|---|---|---|
| 982,028 | Austin | Jan. 17, 1911 |
| 1,057,708 | Chapin | Apr. 1, 1913 |
| 1,286,046 | Marks | Nov. 26, 1918 |
| 2,554,100 | Facchini | May 22, 1951 |
| 2,593,172 | Neumann | Apr. 15, 1952 |
| 2,607,225 | Biscoe | Aug. 19, 1952 |